April 7, 1953  P. H. HERRICK  2,633,981
VENDING CAPSULE
Filed Sept. 20, 1949

INVENTOR.
PAT H. HERRICK.
BY Howard J. Whelan
ATTORNEY.

Patented Apr. 7, 1953

2,633,981

UNITED STATES PATENT OFFICE 2,633,981

VENDING CAPSULE

Pat H. Herrick, Baltimore, Md., assignor to Products Manufacturing Co., Inc., a corporation of Maryland Application September 20, 1949, Serial No. 116,774

1 Claim. (Cl. 206—42)

This invention relates to capsules or ampules and the like and more particularly to those intended for dispensing, in a slot machine.

It has among its objects to provide a new and improved capsule for pills and tablets that will avoid one or more of the disadvantages and limitations of the prior art.

Another object of the invention is to provide a new and improved capsule that will have a removable section capable of being easily taken off and replaced, so that the tablets or pills therein may be removed one or more at a time.

A further object of the invention is to provide a new and improved capsule that will be suitable for placement in a dispensing machine and hold as many tablets or pills as may be suitable for the article or substance to be dispensed.

A further object of the invention is to provide a new and improved capsule that will have indentations between the sections so they can be easily separated by the finger nail or the like and the tablets removed one or more at a time and the cap replaced without defacing same against reuse until the capsule is emptied.

Other objects will become apparent as the invention is more fully set forth.

For a better understanding of the invention, its objects and the principles thereof reference is made to the attached drawings. These drawings in conjunction with the following description outline a particular form by way of example, while the claim emphasizes the scope of the invention.

In the drawings.

Similar reference characters relate to the same parts throughout the drawings.

Figure 1:
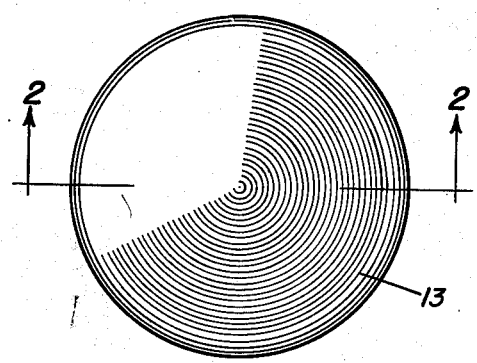
Figure 1 is a plan view of a capsule embodying this invention.
Figure 2:
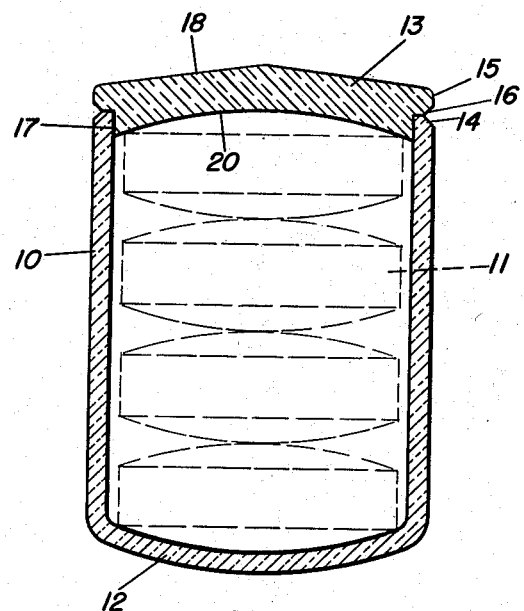
Figure 2 is a sectional view taken on the line 2—2 of Figure 1.

In the construction shown in the drawings, a shell 10, is made of plastic material preferably transparent or translucent so the contents, consisting of pills or tablets 11, may be observed therethrough. The shell 10 is open at its top end and closed and rounded at its lower end by a bottom wall 12. The bottom 12 is preferably slightly concaved interiorly and convexed exteriorly as indicated to facilitate handling and placement in a dispensing machine. One type of dispensing machine to which the capsule is applicable is that described in the copending application for patent of the same applicant, Ser. No. 114,415 filed September 7, 1949, and Patent No. 2,433,873 issued January 6, 1948.

The open end of the shell is closed by an insertable cap 13, and is bevelled at its edge portion 14 to symmetrically agree with edge 16 of the peripheral rim 15 of the cap or top 13 where same is formed to fit on the wall of the shell. The cap is held in place by a restricted insertable or neck portion 17 that fits snugly against the inside surface of the shell, as shown. The lower surface of the portion or neck 17 is concaved at 20. The cap 13 is tapered or convexed on its outer surface 18.

The tablets 11 are of conventional form and are preferably convexed as indicated and fit one over the other transversely in the shell 10. They are preferably circular to fit the cylindrical form of the shell 10 and fit loosely therein so they will not stick to the wall thereof.

The V-formed slot formed by the cap 13 and the shell 10 by the rims 14 and 16 enable the user to insert his finger nails therein for the removal of the cap or in case of real difficulty permit the insertion of a nail file or the like for the same purpose.

The capsule forms a casing for the inclosure of the pills 11 and keeps them clean. The arrangement also prevents the dispenser from being contaminated by rubbings from the sides of the pills particularly where same is of an easily powdered substance. The V-slot facilitates the opening of the capsule through the removal of the cap. The neck 17 permits a certain amount of adjustment of the cap and allows for the expansion of the pills if it should occur. The rounded form and edges of the capsule reduce the jar and tendency to cause breakage of the contents while the capsule is being handled or being moved through the parts of the machine that dispenses them.

While but one form of the invention is shown in the drawings and described herein, it is not desired to limit this application thereto, as it is appreciated that other forms could be designated and made that would employ the same principles and come within the scope of the appended claim.

Having thus described the invention, what is claimed is:

As an article of manufacture, a capsule containing a stack of circular pills having opposite upper and lower convex surfaces along their vertical axis, comprising a cylindrical shell having a diameter greater than that of the pills, said shell having an integral closed end and an opposite open end, the closed end being inwardly concave to correspond with the lower convex surface of the lowermost pill, a cap having a restricted neck inserted in the open end of the shell and fitting snugly against the internal wall of the shell, said cap and open end having outer cooperative bevelled peripheral faces providing a groove therebetween for enabling the fingers of the user to be inserted in the groove and grip the cap for its removal, and the said cap having a concave inner wall to correspond with the upper convex surface of the uppermost pill, whereby the lowermost pill rests on the closed end of the shell and the uppermost pill contacts the cap and the pills are kept in tight stacked position.

PAT H. HERRICK.

REFERENCES CITED

The following references are of record in the file of this patent:

UNITED STATES PATENTS

| Number | Name | Date |
| --- | --- | --- |
| 484,779 | Cone | Oct. 25, 1892 |
| 634,855 | Pattison | Oct. 10, 1899 |
| 710,060 | Kann | Sept. 30, 1902 |
| 1,278,550 | Adams | Sept. 10, 1918 |
| 1,678,642 | Johnson | July 31, 1928 |
| 1,730,126 | Dailey | Oct. 1, 1929 |
| 1,863,001 | Barok et al. | June 14, 1932 |
| 2,304,531 | Bloom et al. | Dec. 8, 1942 |
| 2,378,003 | Duell | June 12, 1945 |

FOREIGN PATENTS

| Number | Country | Date |
| --- | --- | --- |
| 310,681 | Great Britain | May 2, 1929 |